UNITED STATES PATENT OFFICE.

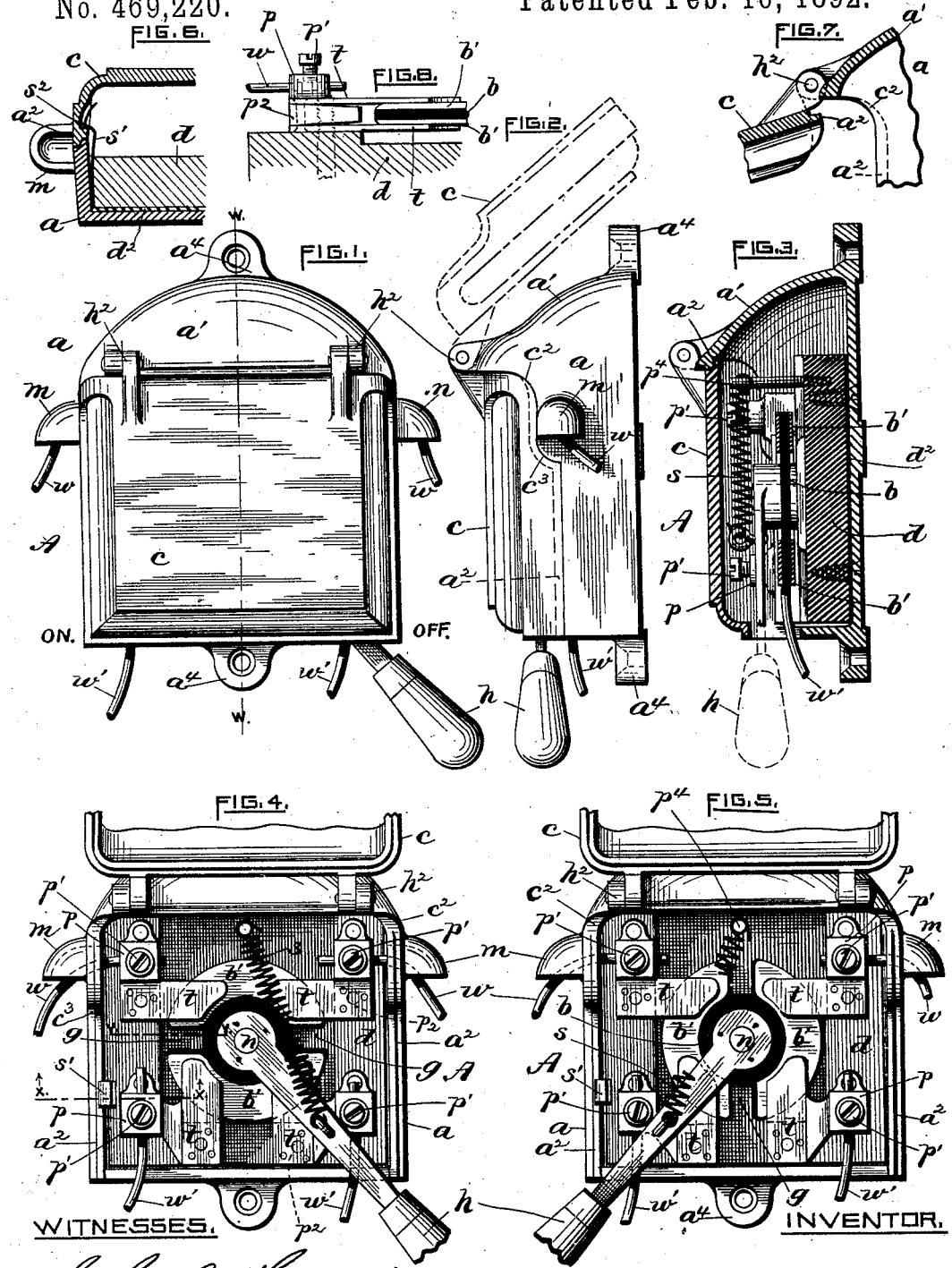

VAN A. THOMAS, OF PROVIDENCE, RHODE ISLAND.

ELECTRIC CUT-OUT.

SPECIFICATION forming part of Letters Patent No. 469,220, dated February 16, 1892.

Application filed May 15, 1891. Serial No. 392,932. (No model.)

*To all whom it may concern:*

Be it known that I, VAN A. THOMAS, a citizen of the United States, residing at Providence, in the county of Providence and State of Rhode Island, have invented certain new and useful Improvements in Electric Cut-Outs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to electric cut-outs such as are more especially adapted to electric-lighting circuits; and it consists, essentially, of a box possessing novel features combined with a movable metallic-faced non-conducting disk provided with oppositely-arranged air-spaces for breaking the arc, main and branch terminals in yielding contact with said metallic faces of the disk, and a spring-resisted lever secured to the disk, all as will be more fully hereinafter set forth and claimed.

In the accompanying sheet of drawings, Figure 1 is a front elevation of an electric cut-out box embodying my improvements. Fig. 2 is a side view of the same. Fig. 3 is a vertical transverse sectional view taken on line $w\ w$ of Fig. 1. Fig. 4 is a front view of the box open, the position of the working lever being "off"—that is, the electric current is not diverted to the branch terminals. Fig. 5 is a similar view, the lever being in the opposite extreme position corresponding to the diversion of the current from the main to the branch terminals. Fig. 6 is a partial inverted horizontal sectional view taken on line $x\ x$ of Fig. 4. Fig. 7 is a partial sectional view of the upper portion of the box, taken at the joint; and Fig. 8 is a horizontal sectional view, inverted, taken on line $y\ y$ of Fig. 4.

My improved cut-out box as a whole is indicated by A. The box proper or casing $a$ is made of suitable metal, as cast-iron, and is provided with suitable ears $a^4$, arranged to receive screws, by means of which it can be secured in position. The top portion $a'$ of the casing is somewhat convex, so as to readily shed water. Near the upper end of the box are located to oppositely-arranged hoods $m$, each serving to protect adjacent openings formed in the sides of the box for the reception of the terminals of the main wire or conductor $w$. To the front of the box is hinged at $h^2$ a cover $c$. The vertical edges of the box, as well as the corresponding edges of the lid or cover, form a rabbet $t^2$, thereby serving to prevent the entrance of water, &c., into the box. The upper inner edge of the cover is provided with a similar projection $a^3$, adapted when the box is closed to protect the corresponding joint. The interior of the box is provided at one side with a spring-catch $s'$, having its free end arranged to spring into a notch $s^2$, formed in the side cover, the latter being distinctly shown in Fig. 6.

The interior mechanism of the cut-out box is mounted on a wooden or non-conducting base $d$ and the whole secured to the casing by screws or in any other suitable manner, insulating material $d^2$ being first interposed between the base and case. (See Figs. 3 and 6.) On a stationary central stud $n$, secured to the base $d$, is loosely mounted a thin insulating block or disk $b$, the same being oppositely cut or notched transversely at $g\ g$. The upper and lower sides or faces of the disk are provided with thin metallic contact-plates $b'$, the ends being separated from each other at the points $g$ just referred to. Near the four corners of the base $d$ are located binding-posts or holders $p$, each provided with a binding-screw $p'$, the two upper holders being adapted to receive and retain the terminals of the main wire or conductor $w$, the other two holders being similarly arranged to retain the branch terminals $w'$. These holders $p$ are each provided with a lateral extension $p^3$, slightly wedge shape in cross-section, (see Fig. 8,) to each of which are secured upper and lower current-conducting plates $t$, arranged to frictionally engage corresponding surfaces of the contact-plates $b'$, secured to the movable non-conducting disk $b$. A handled operating-lever $h$ is secured to the insulating-disk $b$. A coiled spring $s$, attached to the lever and to a pin $p^4$, centrally mounted in the upper portion of the box, serves to retain the lever, &c., in the two extreme positions.

In Fig. 4 the relation of the parts correspond to the off position—that is, the current has been switched off from the branch terminals $w'$. When in this position, an arc cannot be produced between the upper and lower portions of the box, owing to the introduction of the notches $g$, formed in the disk $b$.

In Fig. 5 the lever, &c., are represented as standing in the opposite extreme position. When thus placed, the current from the main or live wire passes directly from the upper current-conducting plates $t$, via the contact-plates $b'$, frictionally connected therewith to the lower conducting-plates, and thence to the corresponding branch wire $w'$. The return current passes upwardly through the other wire $w'$ at the right of the box, and thence through the corresponding conducting and contact-plates to the connected terminal of the live wire. When in this position, the said notches $g$ form an air-space, thereby preventing or breaking the arc.

I claim as my invention—

1. In an electric cut-out, the combination, with a casing having hooded openings and non-conducting base with central stud, of an oppositely-notched insulating-disk loosely mounted on said stud, the separated contact-plates on the upper and lower faces of said disk, the binding-posts with lateral extensions, upper and lower contact-plates secured to said extensions to frictionally engage the contact-plates on the disk, and an operating-lever mounted on the stud and secured to the insulating-disk, substantially as specified.

2. In an electric cut-out, the combination, with a casing having non-conducting base with central stud, of an oppositely-notched insulating-disk loosely mounted on said stud, the separated contact-plates on the said disk, the binding-posts with wedge-shaped lateral extensions, contact-plates secured to said extensions to frictionally engage the contact-plates on the disk, and an operating-lever mounted on the said stud and secured to the insulating-disk, substantially as specified.

In testimony whereof I affix my signature in presence of two witnesses.

VAN A. THOMAS.

Witnesses:
CHARLES HANNIGAN,
GEO. H. REMINGTON.